(12) United States Patent
Xu et al.

(10) Patent No.: US 12,010,649 B2
(45) Date of Patent: Jun. 11, 2024

(54) UNIFIED PAGING EARLY INDICATION DESIGN

(71) Applicant: QUALCOMM Incorporated, San Diego, CA (US)

(72) Inventors: Huilin Xu, Temecula, CA (US); Yuchul Kim, San Diego, CA (US); Yongjun Kwak, San Diego, CA (US); Le Liu, Fremont, CA (US); Wooseok Nam, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 17/444,104

(22) Filed: Jul. 30, 2021

(65) Prior Publication Data
US 2023/0030520 A1    Feb. 2, 2023

(51) Int. Cl.
*H04W 68/02* (2009.01)
*H04W 72/23* (2023.01)

(52) U.S. Cl.
CPC .......... *H04W 68/02* (2013.01); *H04W 72/23* (2023.01)

(58) Field of Classification Search
CPC . H04W 68/005; H04W 24/08; H04W 56/001; H04W 68/02; H04W 68/06; H04W 68/08; H04W 72/0446; H04W 52/0229; H04W 72/1289; H04W 72/1263; H04W 8/24; H04W 72/121; H04W 72/042; H04W 52/0219; H04W 52/0274; H04W 52/0209; H04L 1/0038

USPC ....................................................... 370/328
See application file for complete search history.

(56) References Cited

U.S. PATENT DOCUMENTS

| | | | | |
|---|---|---|---|---|
| 11,368,937 | B2* | 6/2022 | Ryu | H04W 68/005 |
| 11,419,093 | B2* | 8/2022 | Babaei | H04W 72/23 |
| 11,546,879 | B2* | 1/2023 | Babaei | H04W 72/23 |
| 11,576,146 | B1* | 2/2023 | He | H04W 72/23 |
| 2021/0360621 | A1* | 11/2021 | Jiang | H04W 52/0216 |
| 2022/0046582 | A1* | 2/2022 | Shrivastava | H04W 68/02 |
| 2022/0046585 | A1* | 2/2022 | Wu | H04L 5/0053 |
| 2022/0191793 | A1* | 6/2022 | Murray | H04W 72/23 |

(Continued)

OTHER PUBLICATIONS

International Search Report and Written Opinion—PCT/US2022/074003—ISA/EPO—dated Oct. 14, 2022.

(Continued)

*Primary Examiner* — Man U Phan
(74) *Attorney, Agent, or Firm* — Harrity & Harrity, LLP

(57) ABSTRACT

Various aspects of the present disclosure generally relate to wireless communication. In some aspects, a user equipment (UE) may receive a paging early indication (PEI) indicating whether at least one UE in a UE group or a UE sub-group including the UE is to be paged in a paging occasion. In some aspects, a sequence on which the PEI is based is a physical downlink control channel (PDCCH)-based sequence. In some aspects, the PEI is a sequence-based PEI and is received based at least in part on a sequence configuration configured on the UE. In some aspects, the PEI is a sequence-based PEI and is received based at least in part on a distributed resource block allocation associated with the sequence. The UE may selectively process a paging PDCCH associated with the paging occasion based at least in part on the PEI. Numerous other aspects are described.

26 Claims, 10 Drawing Sheets

(56) References Cited

U.S. PATENT DOCUMENTS

| | | | | |
|---|---|---|---|---|
| 2022/0225237 A1* | 7/2022 | He | ............... | H04W 68/005 |
| 2022/0232514 A1* | 7/2022 | Tseng | ............... | H04W 60/00 |
| 2022/0312374 A1* | 9/2022 | Ryu | ............... | H04W 28/0289 |
| 2022/0330201 A1* | 10/2022 | Hwang | ............... | H04W 68/02 |
| 2022/0360402 A1* | 11/2022 | Zhang | ............... | H04W 76/10 |
| 2023/0023161 A1* | 1/2023 | Liu | ............... | H04W 72/1263 |
| 2023/0033440 A1* | 2/2023 | Kadiri | ............... | H04L 12/189 |
| 2023/0037852 A1* | 2/2023 | Islam | ............... | H04L 5/0094 |
| 2023/0043139 A1* | 2/2023 | Hwang | ............... | H04W 68/005 |
| 2023/0044109 A1* | 2/2023 | Xu | ............... | H04W 72/23 |
| 2023/0050894 A1* | 2/2023 | Wu | ............... | H04W 56/003 |
| 2023/0075197 A1* | 3/2023 | Xu | ............... | H04W 68/025 |

OTHER PUBLICATIONS

Moderator (Mediatek): "Summary of Paging Enhancements", 3GPP TSG RAN WG1 #105-e, R1-2106143, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, 95 Pages, Jun. 2, 2021, XP052019153, pp. 1, 2, 4, 6, 7, 21, 50, 51, 59, 65, 72.

OPPO: "Further Discussion on Paging Enhancements for Power Saving", 3GPP TSG RAN WG1 #105-e, R1-2104787, 3rd Generation Partnership Project, Mobile Competence Centre, 650, Route Des Lucioles, F-06921 Sophia-Antipolis Cedex, France , vol. RAN WG1, No. e-Meeting, May 10, 2021-May 27, 2021, 6 Pages, May 12, 2021, XP052011028, pp. 1-4.

* cited by examiner

UNIFIED PAGING EARLY INDICATION DESIGN

FIELD OF THE DISCLOSURE

Aspects of the present disclosure generally relate to wireless communication and to techniques and apparatuses for unified paging early indication (PEI) design.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a paging early indication (PEI), the PEI indicating whether at least one UE in a UE group or a UE sub-group including the UE is to be paged in a paging occasion, where a sequence on which the PEI is based is a physical downlink control channel (PDCCH)-based sequence. The method may include selectively processing a paging PDCCH associated with the paging occasion based at least in part on the PEI.

Some aspects described herein relate to a method of wireless communication performed by a UE. The method may include receiving a PEI, the PEI indicating at least one UE in a UE group or a UE sub-group including whether the UE is to be paged in a paging occasion, where the PEI is a sequence-based PEI, and where the PEI is received based at least in part on a sequence configuration configured on the UE. The method may include selectively processing a paging PDCCH associated with the paging occasion based at least in part on the PEI.

Some aspects described herein relate to a method of wireless communication performed by a UE. The method may include receiving a PEI, the PEI indicating at least one UE in a UE group or a UE sub-group including whether the UE is to be paged in a paging occasion, where the PEI is a sequence-based PEI, and where the PEI is received based at least in part on a distributed resource block allocation associated with the sequence. The method may include selectively processing a paging PDCCH associated with the paging occasion based at least in part on the PEI.

Some aspects described herein relate to a UE for wireless communication. The user equipment may include a memory and one or more processors coupled to the memory. The one or more processors may be configured to receive a PEI, the PEI indicating at least one UE in a UE group or a UE sub-group including whether the UE is to be paged in a paging occasion. The one or more processors may be configured to selectively process a paging PDCCH associated with the paging occasion based at least in part on the PEI.

Some aspects described herein relate to a UE for wireless communication. The UE may include a memory and one or more processors coupled to the memory. The one or more processors may be configured to receive a PEI, the PEI indicating whether at least one UE in a UE group or a UE sub-group including the UE is to be paged in a paging occasion. The one or more processors may be configured to selectively process a paging PDCCH associated with the paging occasion based at least in part on the PEI.

Some aspects described herein relate to a UE for wireless communication. The UE may include a memory and one or more processors coupled to the memory. The one or more processors may be configured to receive a PEI, the PEI indicating whether at least one UE in a UE group or a UE sub-group including the UE is to be paged in a paging occasion. The one or more processors may be configured to selectively process a paging PDCCH associated with the paging occasion based at least in part on the PEI.

Some aspects described herein relate to a non-transitory computer-readable medium that stores a set of instructions for wireless communication by a UE. The set of instructions, when executed by one or more processors of the UE, may cause the UE to receive a PEI, the PEI indicating whether at least one UE in a UE group or a UE sub-group including the UE is to be paged in a paging occasion. The set of instructions, when executed by one or more processors of the UE, may cause the UE to selectively process a paging PDCCH associated with the paging occasion based at least in part on the PEI.

Some aspects described herein relate to a non-transitory computer-readable medium that stores a set of instructions for wireless communication that, when executed by one or more processors of a UE, may cause the UE to receive a PEI, the PEI indicating at least one UE in a UE group or a UE sub-group including whether the UE is to be paged in a paging occasion. The set of instructions, when executed by one or more processors of the UE, may cause the UE to selectively process a paging PDCCH associated with the paging occasion based at least in part on the PEI.

Some aspects described herein relate to a non-transitory computer-readable medium that stores a set of instructions for wireless communication that, when executed by one or more processors of a UE, cause the UE to receive a PEI, the PEI indicating whether at least one UE in a UE group or a UE sub-group including the UE is to be paged in a paging occasion. The set of instructions, when executed by one or more processors of the UE, may cause the UE to selectively process a paging PDCCH associated with the paging occasion based at least in part on the PEI.

Some aspects described herein relate to an apparatus for wireless communication. The apparatus may include means for receiving a PEI, the PEI indicating whether at least one UE in a UE group or a UE sub-group including the UE is to be paged in a paging occasion, where a sequence on which the PEI is based is a PDCCH-based sequence. The apparatus may include means for selectively processing a paging PDCCH associated with the paging occasion based at least in part on the PEI.

Some aspects described herein relate to an apparatus for wireless communication. The apparatus may include means for receiving a PEI, the PEI indicating whether at least one UE in a UE group or a UE sub-group including the UE is to be paged in a paging occasion, where the PEI is a sequence-based PEI, and where the PEI is received based at least in part on a sequence configuration configured on the UE. The apparatus may include means for selectively processing a paging PDCCH associated with the paging occasion based at least in part on the PEI.

Some aspects described herein relate to an apparatus for wireless communication. The apparatus may include means for receiving a PEI, the PEI indicating whether at least one UE in a UE group or a UE sub-group including the UE is to be paged in a paging occasion, where the PEI is a sequence-based PEI, and where the PEI is received based at least in part on a distributed resource block allocation associated with the sequence. The apparatus may include means for selectively processing a paging PDCCH associated with the paging occasion based at least in part on the PEI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
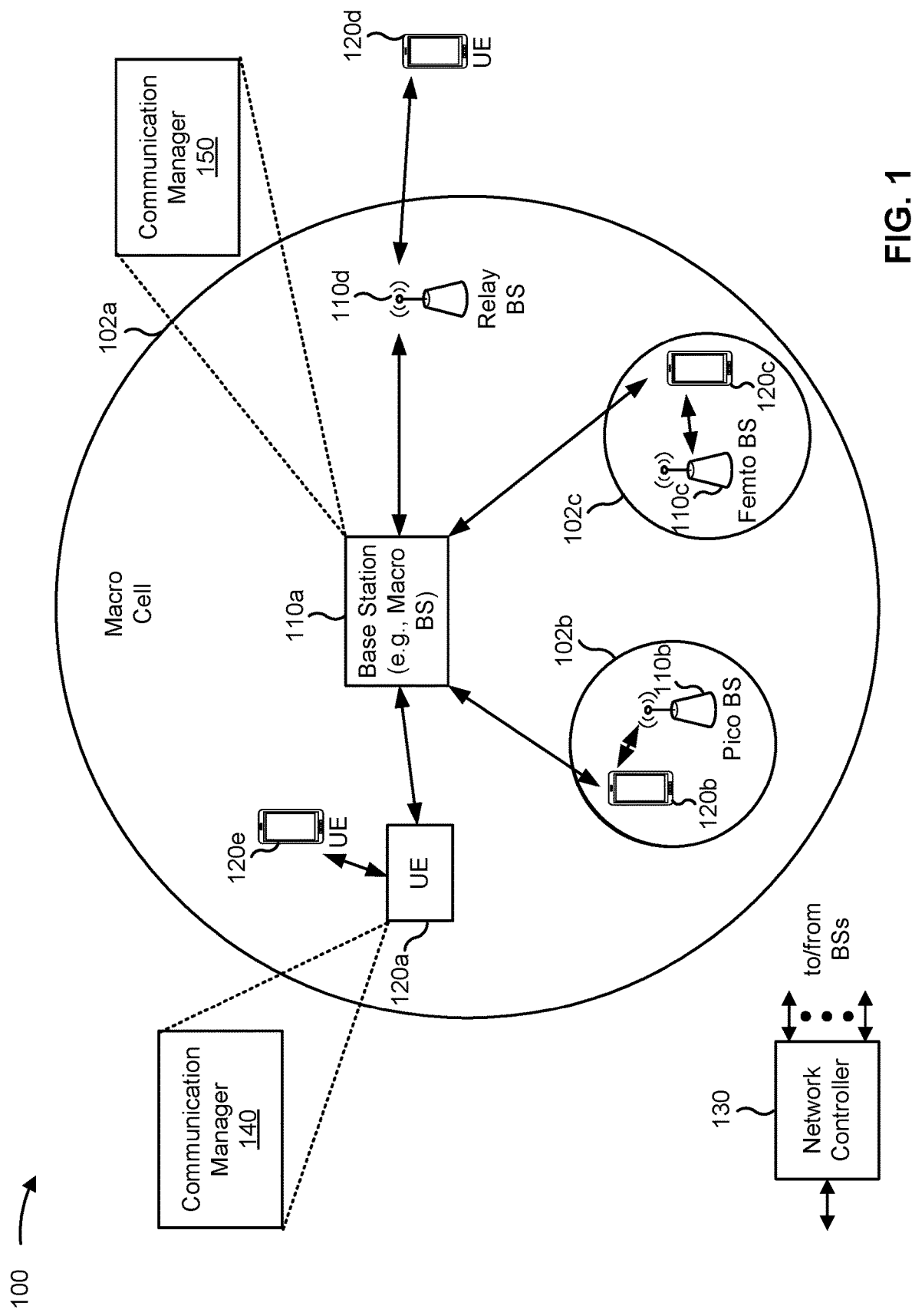
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a paging early indication (PEI), the PEI indicating whether at least one UE in a UE group or a UE sub-group including the UE 120 is to be paged in a paging occasion, wherein a sequence on which the PEI is based is a physical downlink control channel (PDCCH)-based sequence; and selectively process a paging PDCCH associated with the paging occasion based at least in part on the PEI. Additionally, or alternatively, the communication manager 140 may perform one or more other operations described herein.

In some aspects, as described in more detail elsewhere herein, the communication manager 140 may receive a PEI, the PEI indicating whether at least one UE in a UE group or a UE sub-group including the UE 120 is to be paged in a paging occasion, wherein the PEI is a sequence-based PEI, and wherein the PEI is received based at least in part on a sequence configuration configured on the UE; and selectively process a paging PDCCH associated with the paging occasion based at least in part on the PEI. Additionally, or alternatively, the communication manager 140 may perform one or more other operations described herein.

In some aspects, as described in more detail elsewhere herein, the communication manager 140 may receive a PEI, the PEI indicating whether at least one UE in a UE group or a UE sub-group including the UE 120 is to be paged in a paging occasion, wherein the PEI is a sequence-based PEI, and wherein the PEI is received based at least in part on a distributed resource block allocation associated with the sequence; and selectively process a PDCCH associated with the paging occasion based at least in part on the PEI. Additionally, or alternatively, the communication manager 140 may perform one or more other operations described herein.

In some aspects, the base station 110 may include a communication manager 150. As described in more detail elsewhere herein, the communication manager 150 may generate a PEI, the PEI indicating whether at least one UE in a UE group or a UE sub-group is to be paged in a paging occasion, wherein a sequence on which the PEI is based is a PDCCH-based sequence; and transmit the PEI. Additionally, or alternatively, the communication manager 150 may perform one or more other operations described herein.

In some aspects, as described in more detail elsewhere herein, the communication manager 150 may generate a PEI, the PEI indicating whether at least one UE in a UE group or a UE sub-group is to be paged in a paging occasion, wherein the PEI is a sequence-based PEI, and wherein the PEI is generated based at least in part on a sequence configuration configured on the UE 120; and transmit the PEI. Additionally, or alternatively, the communication manager 150 may perform one or more other operations described herein.

In some aspects, as described in more detail elsewhere herein, the communication manager 150 may generate a PEI, the PEI indicating whether at least one UE in a UE group or a UE sub-group including is to be paged in a paging occasion, wherein the PEI is a sequence-based PEI, and wherein the PEI is generated based at least in part on a distributed resource block allocation associated with the sequence; and transmit the PEI. Additionally, or alternatively, the communication manager 150 may perform one or more other operations described herein.

As indicated above, FIG. 1 is provided as an example. Other examples may differ from what is described with regard to FIG. 1.

Figure 2:
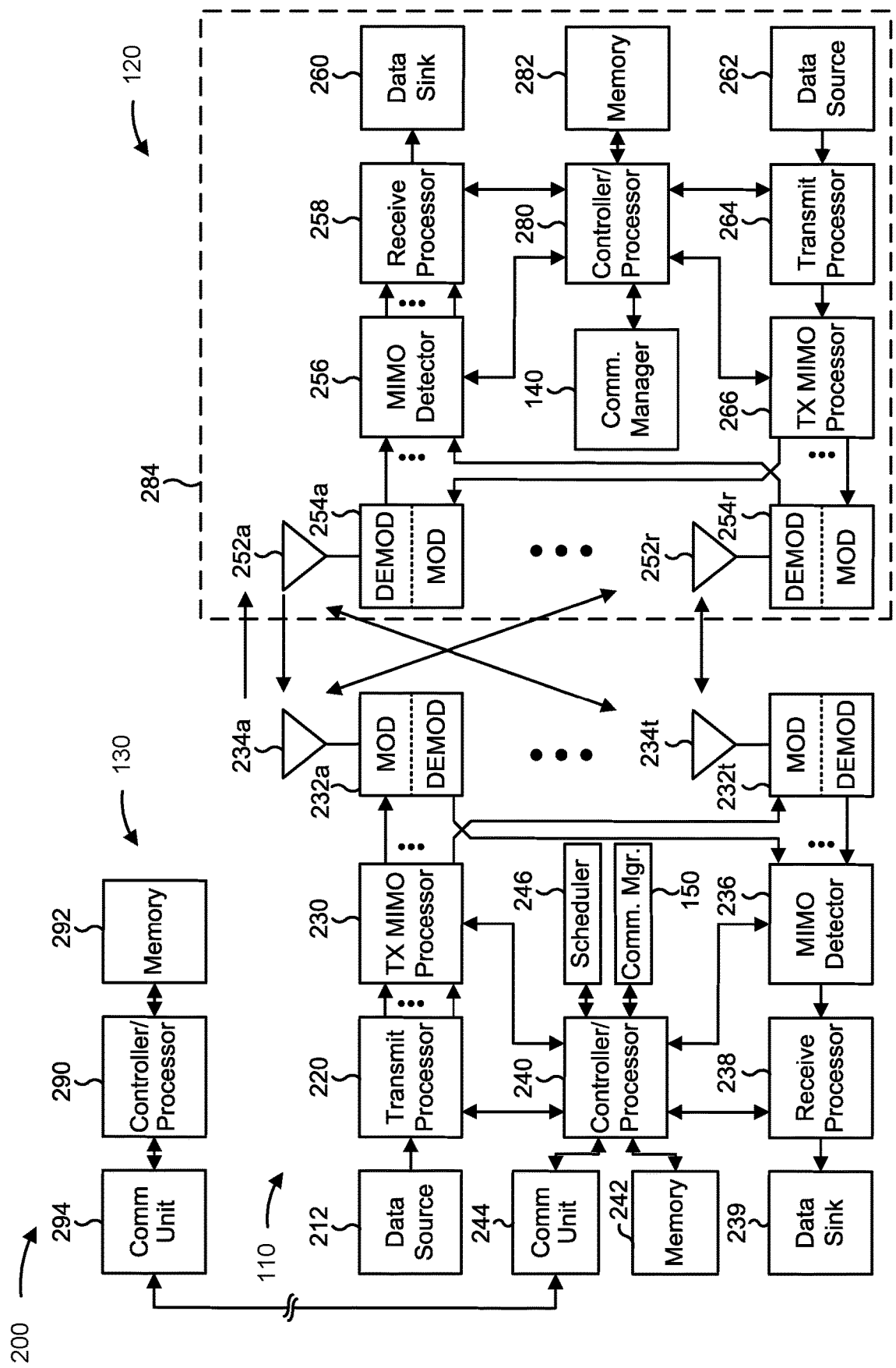
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-10).

The controller/processor 240 of the base station 110, the controller/processor 280 of the UE 120, and/or any other component(s) of FIG. 2 may perform one or more techniques associated with unified PEI design, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving a PEI, the PEI indicating whether at least one UE in a UE group or UE sub-group including the UE 120 is to be paged in a paging occasion, wherein a sequence on which the PEI is based is a PDCCH-based sequence; and/or means for selectively processing a paging PDCCH associated with the paging occasion based at least in part on the PEI. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving a PEI, the PEI indicating whether at least one UE in a UE group or a UE sub-group including the UE 120 is to be paged in a paging occasion, wherein the PEI is a sequence-based PEI, and wherein the PEI is received based at least in part on a sequence configuration configured on the UE 120; and/or means for selectively processing a paging PDCCH associated with the paging occasion based at least in part on the PEI. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving a PEI, the PEI indicating whether at least one UE in a UE group or a UE sub-group including the UE 120 is to be paged in a paging occasion, wherein the PEI is a sequence-based PEI, and wherein the PEI is received based at least in part on a distributed resource block allocation associated with the sequence; and/or means for selectively processing a paging PDCCH associated with the paging occasion based at least in part on the PEI. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for generating a PEI, the PEI indicating whether at least one UE in a UE group or a UE sub-group is to be paged in a paging occasion, wherein a sequence on which the PEI is based is a PDCCH-based sequence; and/or means for transmitting the PEI. The means for the base station 110 to perform operations described herein may include, for example, one or more of communication manager 150, antenna 234, modem 232, TX MIMO processor 230, transmit processor 220, receive processor 238, MIMO detector 236, controller/processor 240, or memory 242.

In some aspects, the base station 110 includes means for generating a PEI, the PEI indicating whether at least one UE in a UE group or a UE sub-group is to be paged in a paging occasion, wherein the PEI is a sequence-based PEI, and wherein the PEI is generated based at least in part on a sequence configuration configured on the UE 120; and/or means for transmitting the PEI. The means for the base station 110 to perform operations described herein may include, for example, one or more of communication manager 150, antenna 234, modem 232, TX MIMO processor 230, transmit processor 220, receive processor 238, MIMO detector 236, controller/processor 240, or memory 242.

In some aspects, the base station 110 includes means for generating a PEI, the PEI indicating whether at least one UE in a UE group or a UE sub-group is to be paged in a paging occasion, wherein the PEI is a sequence-based PEI, and wherein the PEI is generated based at least in part on a distributed resource block allocation associated with the sequence; and/or means for transmitting the PEI. The means for the base station 110 to perform operations described herein may include, for example, one or more of communication manager 150, antenna 234, modem 232, TX MIMO processor 230, transmit processor 220, receive processor 238, MIMO detector 236, controller/processor 240, or memory 242.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In a wireless communication system, a UE may during some periods of time not have an active connection with a base station and, therefore, may not be able to receive signaling dedicated to the UE. For example, a UE operating in a radio resource control (RRC) idle mode does not have an RRC connection with a base station and, therefore, cannot not receive dedicated signaling from the base station. Rather, the UE only receives broadcast information (e.g., synchronization signal blocks (SSBs), system information blocks (SIBs), or the like). One technique by which the base station can establish communication with the UE during such a period of time is through a paging procedure.

According to a typical paging procedure, the base station sends a paging message to the UE 120, where the paging message includes a request to wake from the idle mode and reconnect to the network. The paging message is transmitted in a physical downlink shared channel (PDSCH) communication. Such a communication is herein referred to as a paging PDSCH. Prior to transmitting the paging PDSCH in the PO, the base station needs to transmit, and the UE 120 needs to receive, a physical downlink control channel (PDCCH) communication scheduling the paging PDSCH. Such a communication is herein referred to as a paging PDCCH. Notably, the paging PDCCH may also include information not used in association with scheduling the paging PDSCH, such as a short message (e.g., in a short message field in downlink control format (DCI) format 1_0, using, for example, two bits). The base station transmits the paging PDCCH and the paging PDSCH within a paging occasion (PO) associated with the UE. The PO is a set of resources in which the UE is configured to check for paging messages for the UE.

In practice, when the UE wakes to monitor the PO, timing and/or frequency synchronization between the UE and the base station may be lost. Thus, to obtain reliable paging detection, the UE performs timing/frequency tracking to regain timing/frequency synchronization. For example, the UE may be configured to receive a set of SSBs, may estimate a timing/frequency mismatch based on the set of SSBs, and may compensate for the estimated timing/frequency mismatch accordingly. Therefore, prior to a given configured PO, the UE needs to perform timing/frequency tracking. In some cases, the UE may also use the set of SSBs to update an automatic gain controller (AGC) of the UE. Then, at the configured PO, the UE needs to receive and decode the paging PDCCH. Here, if the paging PDCCH includes scheduling information for a paging PDSCH, then the UE receives and decodes the paging PDSCH.

However, such operation is not efficient in terms of UE resource consumption. For example, the base station transmits only one paging PDCCH for all UEs associated with the same PO. Therefore, all UEs associated with the same PO need to monitor the paging PDCCH. Thus, for a given PO, all UEs configured with the PO may need to performing timing/frequency synchronization, after which all of the UEs receive and decode the paging PDCCH. Here, if the paging PDCCH includes scheduling information for a paging PDSCH, then all of the UEs need to decode the paging PDSCH. However, not all of the UEs associated with the PO are paged by the paging PDSCH in most cases and, therefore, UE processing resources and battery power are wasted for UEs associated with the PO for which the paging PDSCH is not intended. Put another way, the paging PDCCH indicates that at least one UE associated with the PO is being paged, so all UEs associated with the PO need to decode the paging PDSCH. This results in wastage of processing resources and battery power of the UEs that were not paged by the paging PDSCH (e.g., since the UEs that were not paged still need to perform timing/frequency synchronization, receive and decode the paging PDCCH, and receive and decode the paging PDSCH).

In some wireless communication systems, to improve efficiency of the paging procedure (i.e., to reduce wastage of UE processing resources and battery power), the base station may transmit a paging early indication (PEI). A PEI is a communication transmitted prior to a PO associated with the UE. In some cases, the PEI may be also transmitted prior to a set of SSBs that would be used by the UE to perform timing/frequency synchronization. Generally, the PEI informs the UE of whether the UE should process a paging PDCCH and/or a paging PDSCH in one or more upcoming POs. In practice, a UE may receive a PEI indicating whether a paging PDSCH for at least one UE in a UE group of the UE (e.g., a group of UEs, including the UE, that is associated with the one or more upcoming POs) or a UE sub-group of the UE (e.g., a subset of UEs, from the group of UEs, that includes the UE) will be included in an upcoming paging occasion. If the PEI indicates that at least one UE in the UE group or UE sub-group of the UE will be paged in the upcoming PO, then the UE may wake to perform timing/frequency synchronization, perform paging PDCCH reception and decoding, and perform paging PDSCH reception and decoding for the upcoming PO, accordingly. Conversely, if the PEI indicates that no UE in the UE group or UE sub-group will be paged in the upcoming PO, then the UE may skip timing/frequency synchronization, skip paging PDCCH reception and decoding, and skip paging PDSCH reception and decoding for the upcoming PO. In this way, processing resources and battery power of the UE can be conserved. There are a number of possible solutions for generating and communicating a PEI signal. Some possible candidate solutions include PDCCH-based PEIs, secondary synchronization signal (SSS)-based PEIs, tracking reference signal (TRS)-based PEIs, and channel state information reference signal (CSI-RS)-based PEIs.

Some techniques and apparatuses described herein provide unified PEI design. In some aspects, the techniques and apparatuses described herein enable the above-noted candidate solutions for PEI design to be merged. For example, in some aspects, a PDCCH-based sequence may be used as a PEI, where a quantity of realizations of information bits in a PDCCH payload is limited in order to make the PDCCH similar to a sequence. As another example, support of sequence configuration (e.g., a configurable sequence bandwidth, a configurable resource element spacing, or the like) for sequence-based PEIs may enable use of PDCCH-based, SSS-based, TRS-based, and CSI-RS-based designs. As another example, support of distributed resource block (RB) allocation of a sequence (in a manner similar to distributed RB allocation for PDCCH) for sequence-based PEIs may enable use of PDCCH-based, SSS-based, TRS-based, and CSI-RS-based designs. Additional details are provided below.

Figure 3:
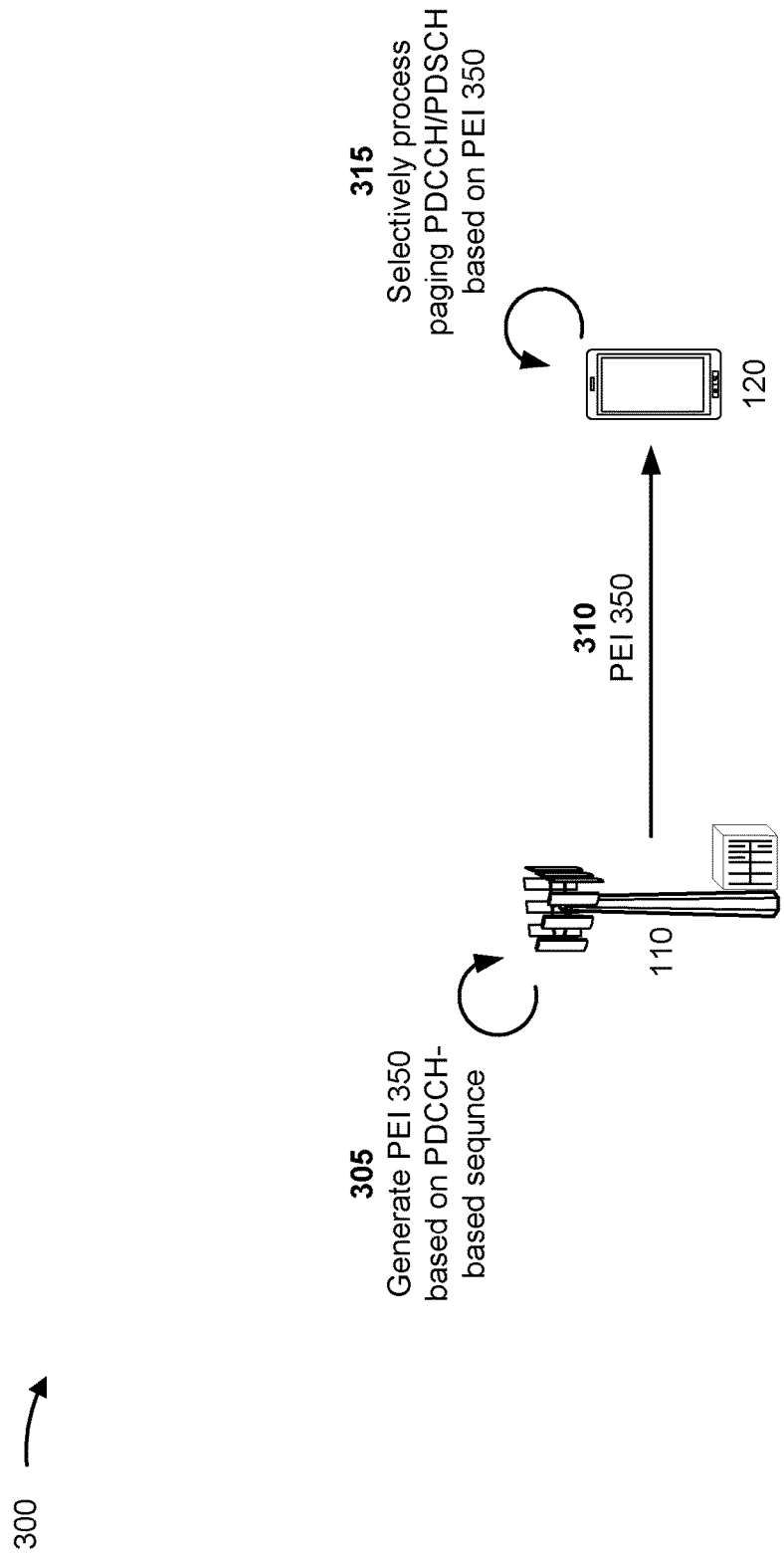
FIGS. 3-5 are diagrams illustrating examples associated with unified PEI design, in accordance with the present disclosure.
Figure 4:
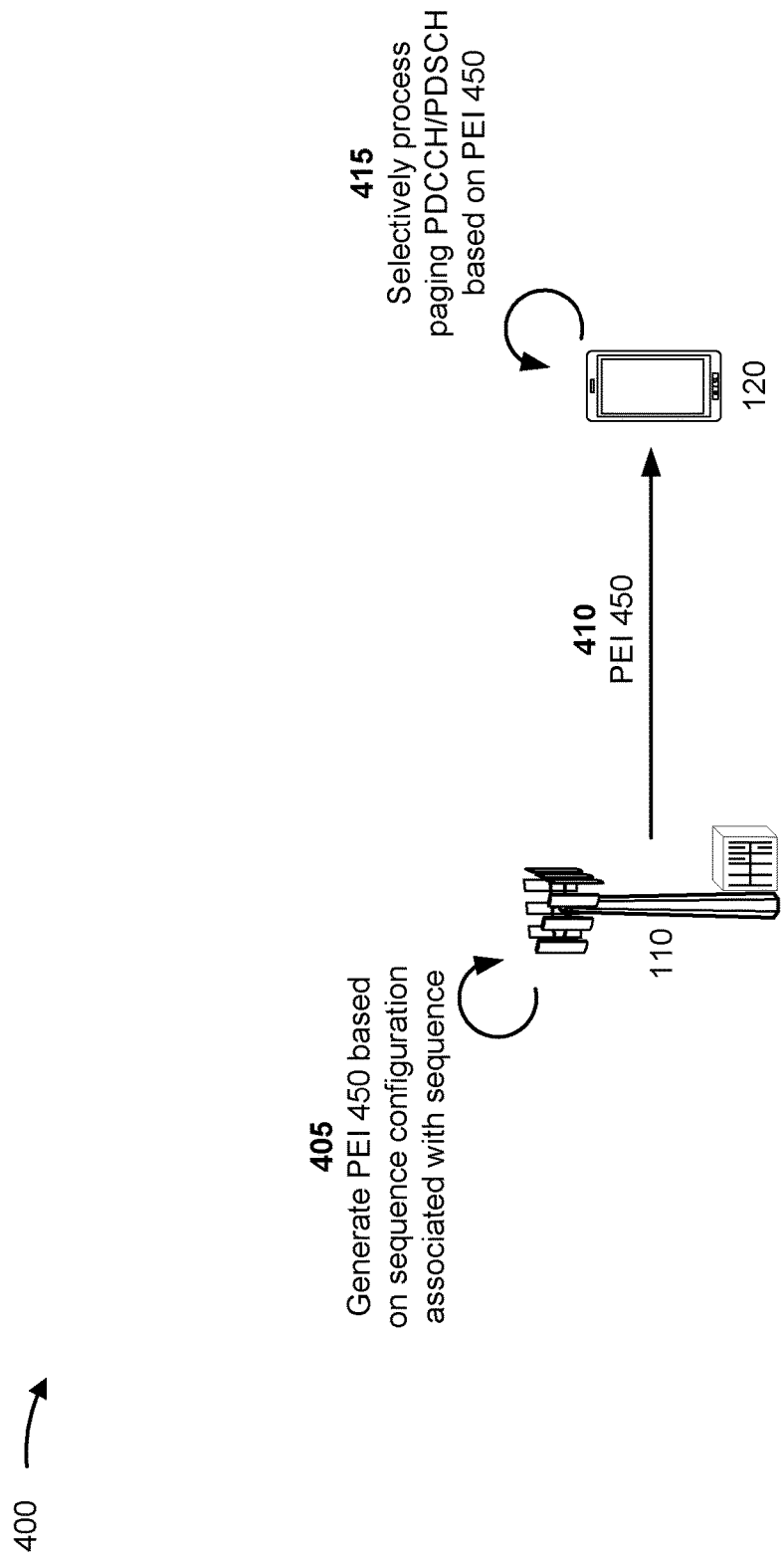
Figure 5:
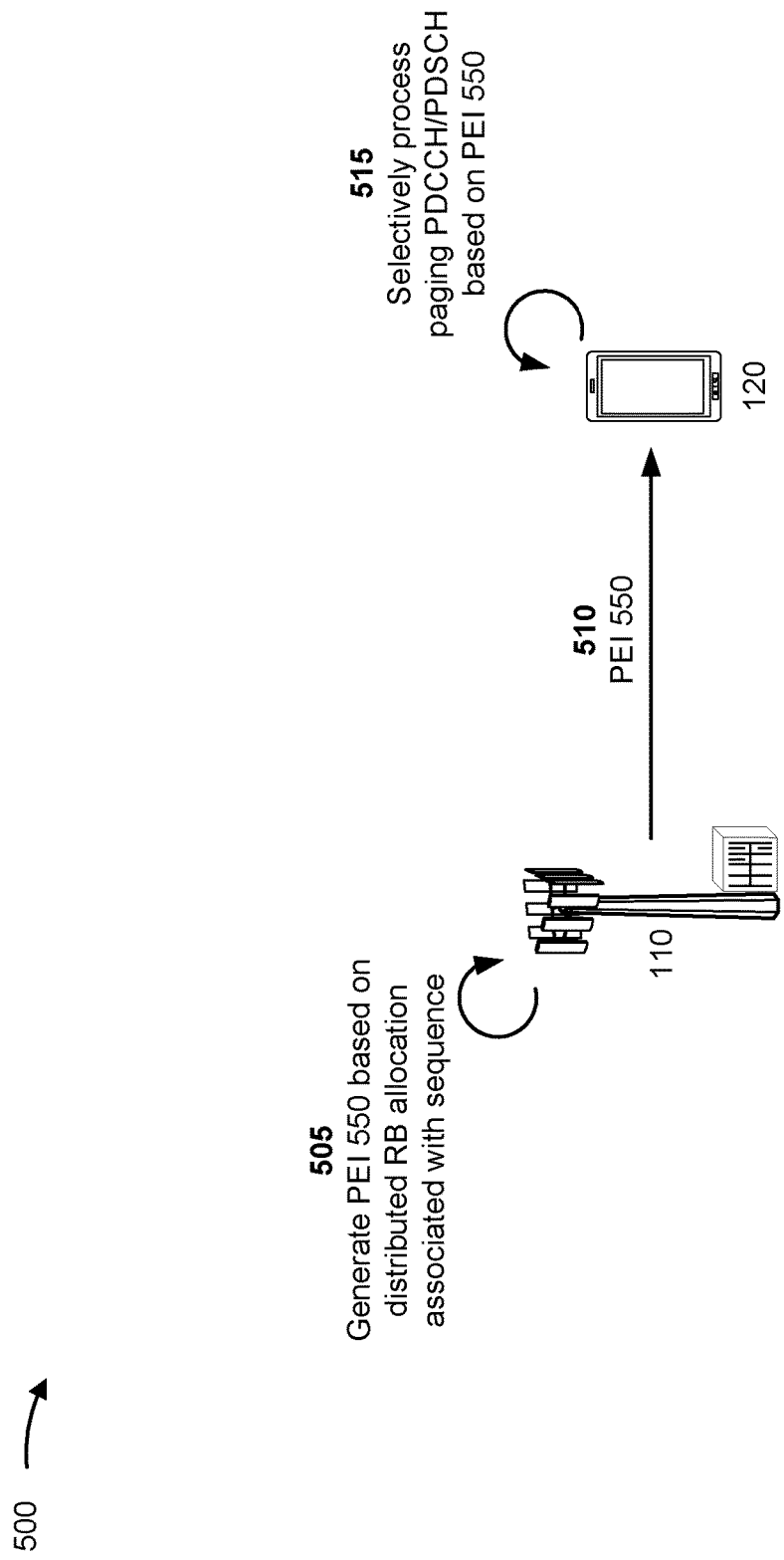

FIGS. 3-5 are diagrams illustrating examples associated with unified PEI design, in accordance with the present disclosure. As shown in FIGS. 3-5, a base station 110 and a UE 120 may communicate with one another (e.g., via a wireless 100).

FIG. 3 is a diagram of an example 300 associated with use of a PDCCH-based sequence for a PEI. As shown by reference number 305, the base station 110 may generate a PEI 350 indicating whether at least one UE in a UE group or UE sub-group including the UE 120 is to be paged in one or more upcoming POs. In some aspects, the base station 110 may generate the PEI 350 based at least in part on a PDCCH-based sequence. That is, a sequence on which the PEI 350 is based may be a PDCCH-based sequence. Additional details regarding PDCCH-based sequences are provided below.

As shown by reference 310, the base station 110 may transmit, and the UE 120 may receive, the PEI 350 indicating whether at least one UE in a UE group or UE sub-group including the UE 120 is to be paged in the one or more upcoming POs. In some aspects, a sequence on which the PEI 350 is based is a PDCCH-based sequence, as noted above.

In some aspects, a set of realizations of (encoded) PDCCH bits can be used for the PEI 350. Here, a sequence generator is a PDCCH encoder. In such a case, different encoded PDCCH bits (i.e., different PDCCH-based sequences) can be generated from different payload (e.g., uncoded) bits or/and different radio network temporary identifiers (RNTIs) (an RNTI is typically used to scramble a set of cyclic redundancy check (CRC) bits of an encoded PDCCH).

Thus, in some aspects, the PDCCH-based sequence associated with the PEI 350 is based at least in part on a set of encoded PDCCH payload bits. For example, a first three bits of a 12-bit payload may be used, and remaining bits may be fixed to the same value (e.g., 0), thereby enabling eight different sequences to be used when the same RNTI is used to scramble a set of CRC bits of the encoded PDCCH. In this way, the sequence used for the PEI 350 may be a PDCCH-based sequence corresponding to a subset of PDCCH bits.

In some aspects, the PDCCH-based sequence associated with the PEI 350 is based at least in part on a set of RNTIs. For example, 12 different RNTIs may be used (e.g., when a single PDCCH bit is repeated 12 times or any single sequence is used), thereby enabling different sequences to be generated. In this way, the sequence used for the PEI 350 may be a PDCCH-based sequence corresponding to a set of RNTIs.

In some aspects, the PDCCH-based sequence associated with the PEI 350 is based at least in part on a set of encoded PDCCH payload bits and a set of RNTIs. For example, two bits of the PDCCH payload (with the other 10 bits being fixed to a particular value) and two RNTIs may be used, thereby enabling eight coded PDCCH-based sequences to be generated. In this way, the sequence used for the PEI 350 may be a PDCCH-base sequence corresponding to a subset of PDCCH bits and an RNTI.

In some aspects, each PDCCH candidate of a plurality of PDCCH candidates may be associated with a corresponding set of UEs 120 (e.g., a UE sub-group) of a plurality of sets of UEs 120 (e.g., a plurality of UE sub-groups). Here, a PDCCH candidate is a set of control channel elements (CCEs) corresponding to a candidate location where a PDCCH can be communicated. Thus, in some aspects, the base station 110 may transmit, and the UE 120 may receive, the PEI 350 in a PDCCH candidate of a plurality of PDCCH candidates, where the PDCCH candidate in which the UE 120 receives the PEI 350 is associated with a set of UEs (e.g., a UE sub-group) that includes the UE 120.

In some aspects, multiple PEIs 350 may be transmitted/received over multiple PDCCH candidates to indicate multiple paged sets of UEs 120 (e.g., paged UE sub-groups). For example, each of eight PDCCH candidates may be used for eight UE sub-groups, each associated with a different one of eight PDCCH-based sequences. Here, a given UE sub-group is paged if the corresponding PDCCH-based sequence is received in one of the eight PDCCH candidates. As another example, four PDCCH candidates may be used for eight UE sub-groups, each associated with a different set of three PDCCH-based sequences (for a total of 12 different PDCCH-based sequences). Here, for a given PDCCH candidate, a set of three PDCCH-based sequences can be used to indicate whether any of two UE sub-groups is paged (e.g., a first UE sub-group is paged if a first PDCCH-based sequence is received, a second UE sub-group is paged if a second PDCCH-based sequence is received, both the first and second UE sub-groups are paged if a third PDCCH-based sequence is received).

In some aspects, as noted above, a given UE sub-group may be associated with a PDCCH candidate. Here, each PDCCH candidate has a corresponding PDCCH index, and the PDCCH index determines a set of CCEs in which the PDCCH candidate is to be communicated. In some aspects, for a given UE sub-group, the UE 120 may detect only one or a subset of PDCCH candidates (e.g., to reduce resource consumption used for PDCCH detection). For example, if a PDCCH monitoring occasion is configured with N (N≥1) PDCCH candidates, the PEI 350 for sub-group i only is transmitted in PDCCH candidate i+4n for n=0, 1, 2 ... when i+4n<N.

As shown by reference 315, the UE 120 may selectively process a paging PDCCH associated with the PO based at least in part on the PEI 350. For example, if the PEI 350 indicates that at least one UE in the UE group or the UE sub-group including the UE 120 is to be paged in an upcoming PO (e.g., if a PDCCH-based sequence associated with the UE 120 is received in the PEI 350), then the UE 120 may receive and decode the paging PDCCH to determine scheduling information for a paging PDSCH, and may receive and decode the paging PDSCH based at least in part on the scheduling information. In some aspects, based at least in part on the PEI 350 indicating that at least one UE in the UE group or the UE sub-group including the UE 120 is to be paged, the UE 120 may wake to receive a set of SSBs and may perform timing/frequency synchronization prior to receiving the paging PDCCH. Conversely, if the PEI 350 does not indicate that at least one UE in the UE group or the UE sub-group including the UE 120 is to be paged in the upcoming PO (e.g., if a PDCCH-based sequence associated with the UE 120 is not received in the PEI 350), then the UE 120 may skip a performance of timing/frequency synchronization, paging PDCCH reception and decoding, and paging PDSCH paging and decoding.

FIG. 4 is a diagram of an example 400 associated with use of a sequence configuration in association with communication of PEIs. As shown by reference number 405, the base station 110 may generate a PEI 450 indicating whether at least one UE in the UE group or the UE sub-group including the UE 120 is to be paged in one or more upcoming POs. In some aspects, the PEI 450 is a sequence-based PEI. In some aspects, the base station 110 may generate the PEI 450 based at least in part on a sequence configuration (e.g., known by the base station 110 to be configured on the UE 120). Additional details regarding the sequence configuration are provided below.

As shown by reference 410, the base station 110 may transmit, and the UE 120 may receive, the PEI 450 indicating whether at least one UE in the UE group or the UE sub-group including the UE 120 is to be paged in the one or more upcoming POs. In some aspects, the UE 120 may receive the PEI based at least in part on the sequence configuration configured on the UE 120. That is, the base station 110 may transmit, and the UE 120 may receive, the PEI 450 according to a sequence configuration (e.g., configured on the UE 120 by the base station 110).

In some aspects, the sequence configuration indicates a sequence generation technique associated with the PEI 450. For example, the sequence configuration may indicate that the sequence associated with the PEI 450 is a Gold sequence. As another example, the sequence configuration may indicate that the sequence associated with the PEI 450 is an encoded PDCCH sequence.

In some aspects, the sequence configuration indicates a symbol allocation associated with the PEI 450. For example, in some aspects, the symbol allocation can be in a single symbol, multiple consecutive symbols, or multiple non-consecutive symbols (e.g., similar to a TRS) in one or more slots.

In some aspects, the sequence configuration indicates a quantity of RBs allocated for the PEI 450. For example, in some aspects, the quantity of RBs allocated for the PEI 450 may be 11 RBs or 24 RBs, among other examples.

In some aspects, the sequence configuration indicates a resource element (RE) spacing for the PEI 450. For example, in some aspects, the sequence configuration may indicate that the RE spacing for the PEI 450 is four (e.g., for a TRS or CSI-RS based sequence). As another example, in some aspects, the sequence configuration may indicate that the RE spacing for the PEI 450 is one (e.g., for an SSS or PDCCH based sequence).

In some aspects, the sequence configuration indicates a starting RE of the PEI 450 in particular RB. For example, in some aspects, the sequence configuration may indicate that the starting RE for the PEI 450 in a first RB (i.e., the RB with the lowest frequency among all RBs allocated for the sequence) is eight (e.g., for an SSS based sequence).

In some aspects, the sequence configuration indicates an ending RE of the PEI 450 in a particular RB. For example, in some aspects, the sequence configuration may indicate that the ending RE for the PEI 450 in a last RB (i.e., the RB with the highest frequency among all RBs allocated for the sequence) is two (e.g., for an SSS based sequence).

In some aspects, the PEI 450 may be based on a sequence associated with an SSS. In some aspects, the PEI 450 may be based on a sequence associated with a TRS. In some aspects, the PEI 450 may be based on a sequence associated with a CSI-RS. In some aspects, the PEI 450 may be based on a PDCCH-based sequence.

As shown by reference 415, the UE 120 may selectively process a paging PDCCH associated with the PO based at least in part on the PEI 450. For example, if the PEI 450 indicates that at least one UE in the UE group or the UE sub-group including the UE 120 is to be paged in an upcoming PO (e.g., if a sequence associated with the UE 120 is received in the PEI 450), then the UE 120 may receive and decode the paging PDCCH to determine scheduling information for a paging PDSCH, and may receive and decode the paging PDSCH based at least in part on the scheduling information. In some aspects, based at least in part on the PEI 450 indicating that the UE 120 is to be paged, the UE 120 may wake to receive a set of SSBs and may perform timing/frequency synchronization prior to receiving the paging PDCCH. Conversely, if the PEI 450 does not indicate that at least one UE in the UE group or the UE sub-group including the UE 120 is to be paged in the upcoming PO (e.g., if the sequence associated with the UE 120 is not received in the PEI 450), then the UE 120 may skip a performance of timing/frequency synchronization, paging PDCCH reception and decoding, and paging PDSCH paging and decoding.

FIG. 5 is a diagram of an example 500 associated with use of a distributed RB allocation in association with communication of PEIs. As shown by reference number 505, the base station 110 may generate a PEI 550 indicating whether the UE 120 is to be paged in one or more upcoming POs. In some aspects, the PEI 550 is a sequence-based PEI. In some aspects, the base station 110 may generate the PEI 550 based at least in part on a distributed RB allocation associated with the sequence (e.g., known by the base station 110 to be configured on the UE 120). Additional details regarding the distributed RB allocation are provided below.

As shown by reference 510, the base station 110 may transmit, and the UE 120 may receive, the PEI 550 indicating whether at least one UE in the UE group or the UE sub-group including the UE 120 is to be paged in the one or more upcoming POs. In some aspects, the UE 120 may receive the PEI 550 based at least in part on the distributed RB allocation configured on the UE 120. That is, the base station 110 may transmit, and the UE 120 may receive, the PEI 450 according to a distributed RB allocation configured on the UE 120 (e.g., by the base station 110).

In some aspects, the base station 110 transmits, and the UE 120 receives, the PEI 550 based at least in part on a reference control resource set (CORESET) and a corresponding interleaved CCE to resource element group (REG) mapping for distributed CCE allocation associated with a set of PDCCH candidates. In other words, a distributed RB allocation may be adopted for use of a sequence-based PEI 550, where a reference CORESET and corresponding interleaved CCE-to-REG mapping is defined for distributed CCE allocation to each PDCCH candidate. This allows a sequence associated with the PEI 550 to be mapped to REs of a PDCCH candidate, and enables alignment of resource allocation between legacy PDCCH and sequence-based PEIs. In one example, by distributed RB allocation, a PEI 550 occupies CCEs for only one PDCCH candidate instead of blocking each PDCCH candidate in the CORESET. In some aspects, the base station 110 may transmit, and the UE 120 may receive, the PEI 550 based at least in part on a mapping of a sequence to REs of a PDCCH candidate (e.g., where "mapping" means that the sequence is transmitted in REs of the PDCCH candidate). In some aspects, the distributed RB allocation is indicated in a PEI configuration configured on the UE 120.

In some aspects, the PEI 550 may be based on a sequence associated with an SSS. In some aspects, the PEI 550 may be based on a sequence associated with a TRS. In some aspects, the PEI 550 may be based on a sequence associated with a CSI-RS. In some aspects, the PEI 550 may be based on a PDCCH-based sequence.

As shown by reference 515, the UE 120 may selectively process a paging PDCCH associated with the PO based at least in part on the PEI 550. For example, if the PEI 550 indicates that at least one UE in the UE group or the UE sub-group including the UE 120 is to be paged in an upcoming PO (e.g., if a sequence associated with the UE 120 is received in the PEI 550), then the UE 120 may receive and decode the paging PDCCH to determine scheduling information for a paging PDSCH, and may receive and decode the paging PDSCH based at least in part on the scheduling information. In some aspects, based at least in part on the PEI 550 indicating that at least one UE in the UE group or the UE sub-group including the UE 120 is to be paged, the UE 120 may wake to receive a set of SSBs and may perform timing/frequency synchronization prior to receiving the paging PDCCH. Conversely, if the PEI 550 does not indicate that at least one UE in the UE group or the UE sub-group including the UE 120 is to be paged in the upcoming PO (e.g., if a sequence associated with the UE 120 is not received in the PEI 550), then the UE 120 may skip a performance of timing/frequency synchronization, paging PDCCH reception and decoding, and paging PDSCH paging and decoding.

As indicated above, FIGS. 3-5 are provided as examples. Other examples may differ from what is described with respect to FIGS. 3-5.

Figure 6:
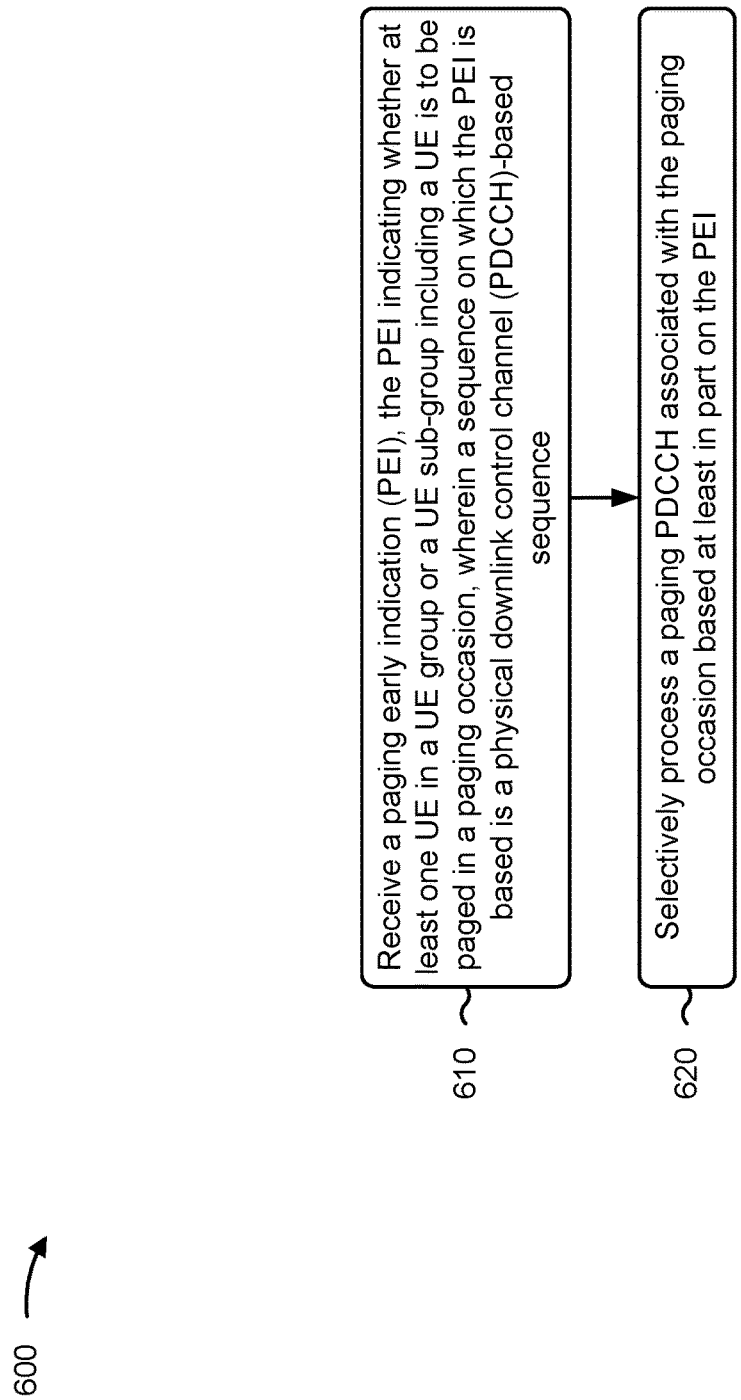
FIGS. 6-8 are diagrams illustrating example processes associated with unified PEI design, in accordance with the present disclosure.

FIG. 6 is a diagram illustrating an example process 600 performed, for example, by a UE, in accordance with the present disclosure. Example process 600 is an example where the UE (e.g., UE 120) performs operations associated with unified PEI design.

As shown in FIG. 6, in some aspects, process 600 may include receiving a PEI, the PEI indicating whether at least one UE in a UE group or a UE sub-group including the UE is to be paged in a paging occasion, wherein a sequence on which the PEI is based is a PDCCH-based sequence (block 610). For example, the UE (e.g., using communication manager 140 and/or reception component 902, depicted in FIG. 9) may receive a PEI, the PEI indicating whether at least one UE in a UE group or a UE sub-group including the UE is to be paged in a paging occasion, as described above. In some aspects, a sequence on which the PEI is based is a PDCCH-based sequence.

As further shown in FIG. 6, in some aspects, process 600 may include selectively processing a paging PDCCH associated with the paging occasion based at least in part on the PEI (block 620). For example, the UE (e.g., using communication manager 140 and/or PDCCH processing component 908, depicted in FIG. 9) may selectively process a paging PDCCH associated with the paging occasion based at least in part on the PEI, as described above.

Process 600 may include additional aspects, such as any single aspect or any combination of aspects described below and/or in connection with one or more other processes described elsewhere herein.

In a first aspect, the PDCCH-based sequence is based at least in part on a set of encoded PDCCH payload bits.

In a second aspect, alone or in combination with the first aspect, the PDCCH-based sequence is based at least in part on a set of RNTIs.

In a third aspect, alone or in combination with one or more of the first and second aspects, the PDCCH-based sequence is based at least in part on a set of encoded PDCCH payload bits and a set of RNTIs.

In a fourth aspect, alone or in combination with one or more of the first through third aspects, the PEI is received in a PDCCH candidate of a plurality of PDCCH candidates, wherein each PDCCH candidate of the plurality of PDCCH candidates is associated with a corresponding set of UEs of a plurality of sets of UEs.

In a fifth aspect, alone or in combination with one or more of the first through fourth aspects, the PDCCH candidate is associated with a set of UEs, of the plurality of sets of UEs, that includes the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
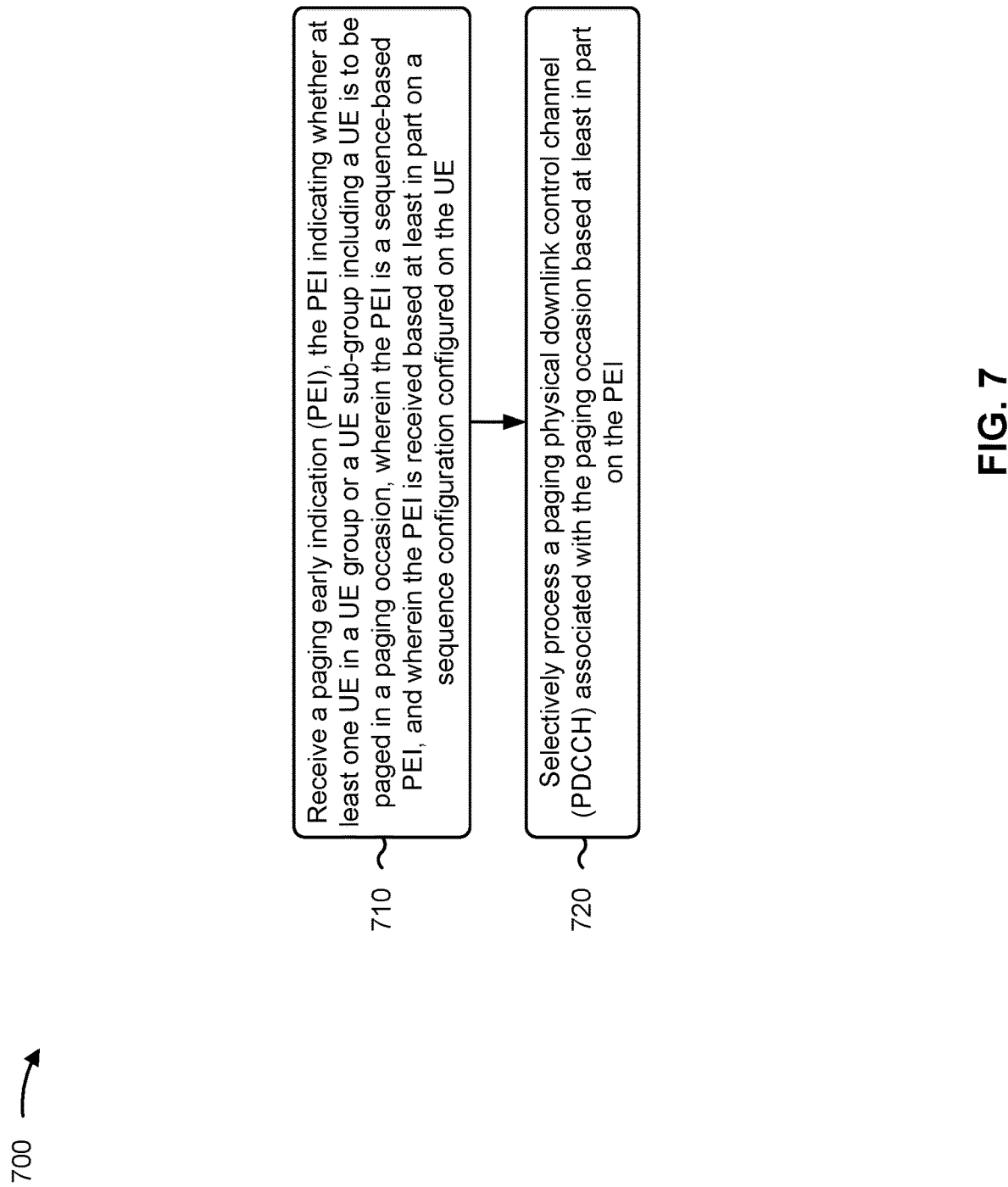

FIG. 7 is a diagram illustrating an example process 700 performed, for example, by a UE, in accordance with the present disclosure. Example process 700 is an example where the UE (e.g., UE 120) performs operations associated with unified PEI design.

As shown in FIG. 7, in some aspects, process 700 may include receiving a PEI, the PEI indicating whether at least one UE in a UE group or a UE sub-group including the UE is to be paged in a paging occasion, wherein the PEI is a sequence-based PEI, and wherein the PEI is received based at least in part on a sequence configuration configured on the UE (block 710). For example, the UE (e.g., using communication manager 140 and/or reception component 902, depicted in FIG. 9) may receive a PEI, the PEI indicating whether at least one UE in a UE group or a UE sub-group including the UE is to be paged in a paging occasion, as described above. In some aspects, the PEI is a sequence-based PEI. In some aspects, the PEI is received based at least in part on a sequence configuration configured on the UE.

As further shown in FIG. 7, in some aspects, process 700 may include selectively processing a paging PDCCH associated with the paging occasion based at least in part on the PEI (block 720). For example, the UE (e.g., using communication manager 140 and/or PDCCH processing component 908, depicted in FIG. 9) may selectively process a paging PDCCH associated with the paging occasion based at least in part on the PEI, as described above.

Process 700 may include additional aspects, such as any single aspect or any combination of aspects described below and/or in connection with one or more other processes described elsewhere herein.

In a first aspect, the sequence configuration indicates a sequence generation technique associated with the PEI.

In a second aspect, alone or in combination with the first aspect, the sequence configuration indicates a symbol allocation associated with the PEI.

In a third aspect, alone or in combination with one or more of the first and second aspects, the sequence configuration indicates a quantity of resource blocks allocated for the PEI.

In a fourth aspect, alone or in combination with one or more of the first through third aspects, the sequence configuration indicates a resource element spacing for the PEI.

In a fifth aspect, alone or in combination with one or more of the first through fourth aspects, the sequence configuration indicates a starting resource element of the PEI in a particular resource block.

In a sixth aspect, alone or in combination with one or more of the first through fifth aspects, the sequence configuration indicates an ending resource element of the PEI in a particular resource block.

In a seventh aspect, alone or in combination with one or more of the first through sixth aspects, the PEI is based on a sequence associated with an SSS.

In an eighth aspect, alone or in combination with one or more of the first through seventh aspects, the PEI is based on a sequence associated with a TRS.

In a ninth aspect, alone or in combination with one or more of the first through eighth aspects, the PEI is based on a sequence associated with a CSI-RS.

In a tenth aspect, alone or in combination with one or more of the first through ninth aspects, the PEI is based on a PDCCH-based sequence.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
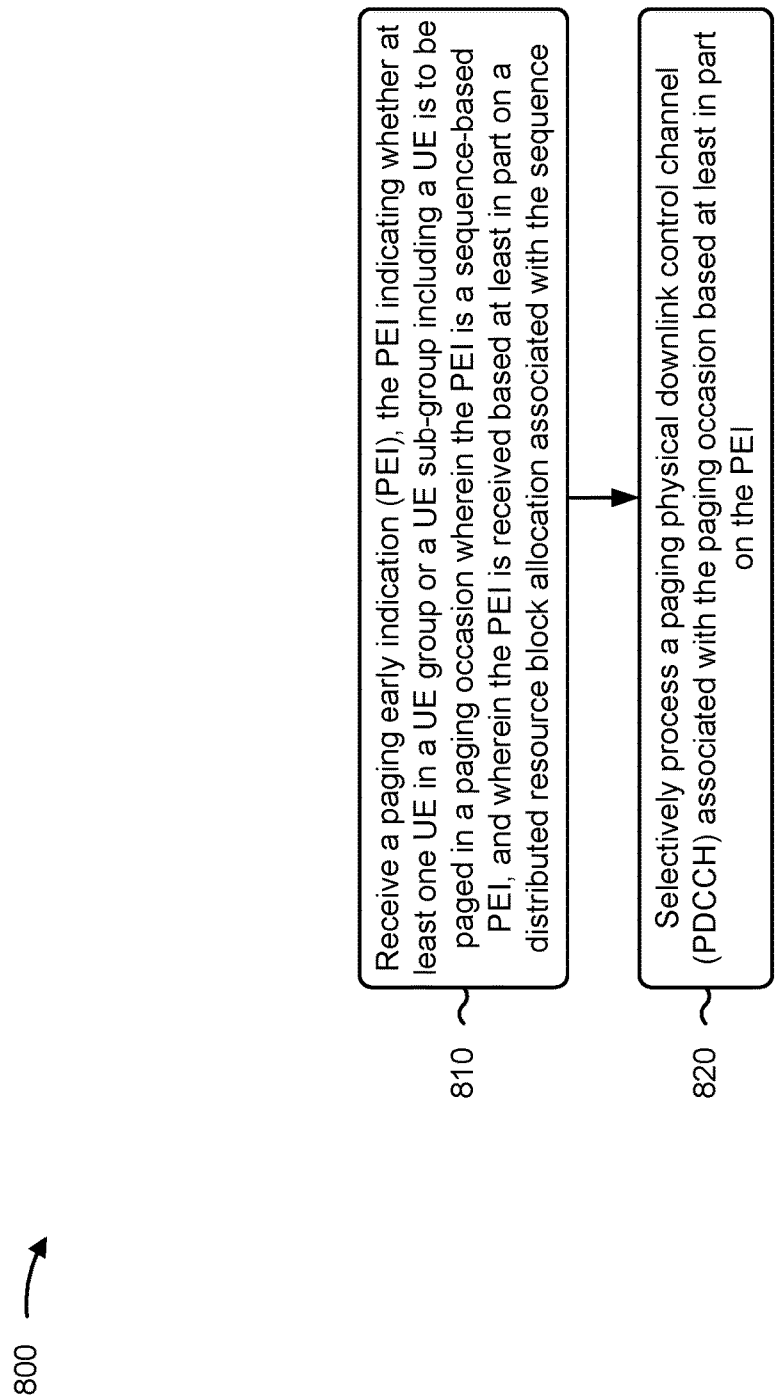

FIG. 8 is a diagram illustrating an example process 800 performed, for example, by a UE, in accordance with the present disclosure. Example process 800 is an example where the UE (e.g., UE 120) performs operations associated with unified PEI design.

As shown in FIG. 8, in some aspects, process 800 may include receiving a PEI, the PEI indicating whether at least one UE in a UE group or a UE sub-group including the UE is to be paged in a paging occasion, wherein the PEI is a sequence-based PEI, and wherein the PEI is received based at least in part on a distributed resource block allocation associated with the sequence (block 810). For example, the UE (e.g., using communication manager 140 and/or reception component 902, depicted in FIG. 9) may receive a PEI, the PEI indicating whether at least one UE in a UE group or a UE sub-group including the UE is to be paged in a paging occasion, as described above. In some aspects, the PEI is a sequence-based PEI. In some aspects, the PEI is received based at least in part on a distributed resource block allocation associated with the sequence.

As further shown in FIG. 8, in some aspects, process 800 may include selectively processing a PDCCH associated with the paging occasion based at least in part on the PEI (block 820). For example, the UE (e.g., using communication manager 140 and/or PDCCH processing component 908, depicted in FIG. 9) may selectively process a paging PDCCH associated with the paging occasion based at least in part on the PEI, as described above.

Process 800 may include additional aspects, such as any single aspect or any combination of aspects described below and/or in connection with one or more other processes described elsewhere herein.

In a first aspect, the PEI is received based at least in part on a reference CORESET and a corresponding interleaved CCE to REG mapping for distributed CCE allocation associated with a set of PDCCH candidates.

In a second aspect, alone or in combination with the first aspect, the PEI is received based at least in part on a mapping of a sequence to resource elements of a PDCCH candidate.

In a third aspect, alone or in combination with one or more of the first and second aspects, the distributed resource block allocation is indicated in a PEI configuration configured on the UE.

In a fourth aspect, alone or in combination with one or more of the first through third aspects, the PEI is based on a sequence associated with an SSS.

In a fifth aspect, alone or in combination with one or more of the first through fourth aspects, the PEI is based on a sequence associated with a TRS.

In a sixth aspect, alone or in combination with one or more of the first through fifth aspects, the PEI is based on a sequence associated with a CSI-RS.

In a seventh aspect, alone or in combination with one or more of the first through sixth aspects, the PEI is based on a PDCCH-based sequence.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
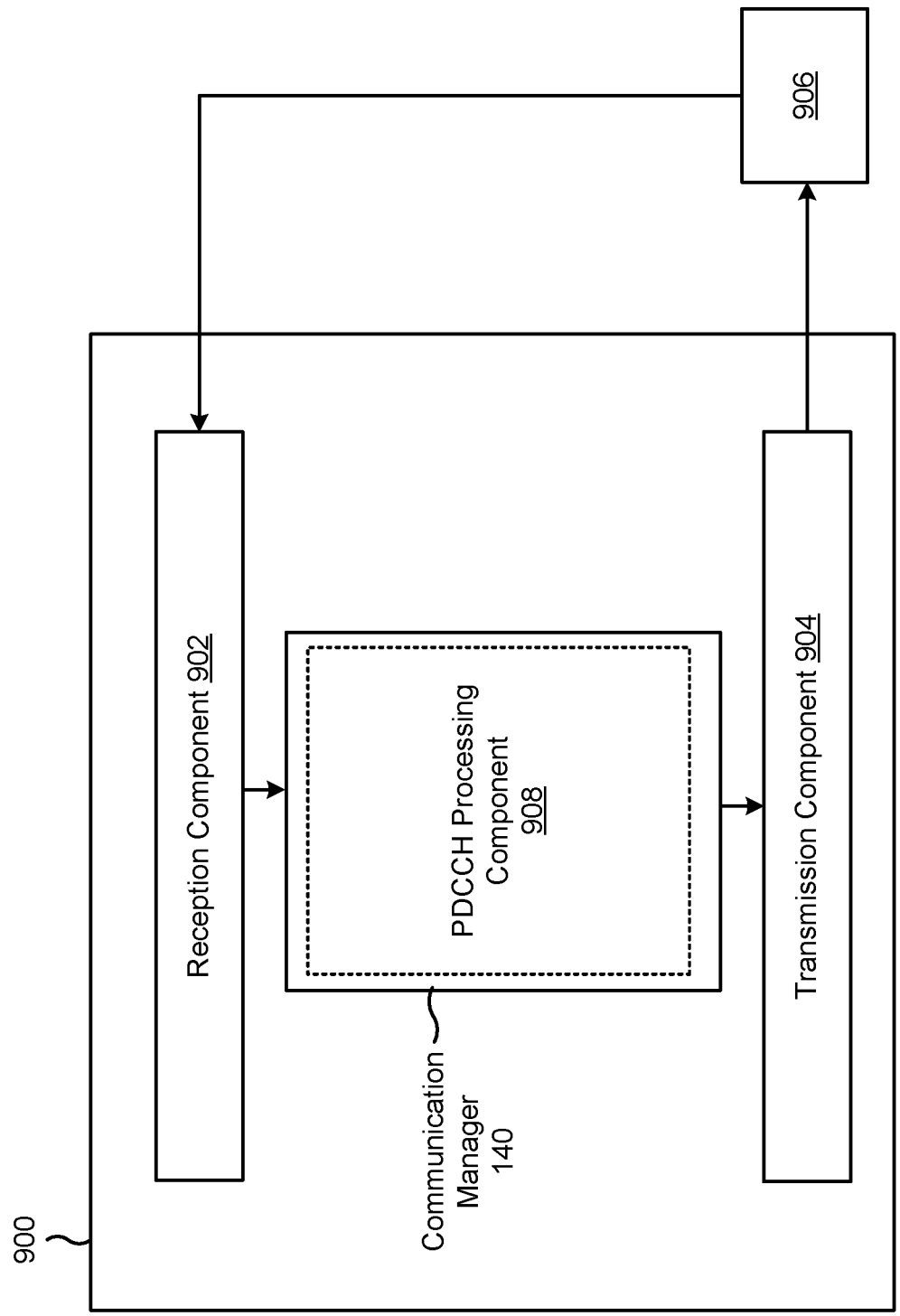
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a PDCCH processing component 908, among other examples.

In some aspects, the apparatus 900 may be configured to perform one or more operations described herein in connection with FIGS. 3-5. Additionally, or alternatively, the apparatus 900 may be configured to perform one or more processes described herein, such as process 600 of FIG. 6, process 700 of FIG. 7, process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

In some aspects, the reception component 902 may receive a PEI, the PEI indicating whether at least one UE in a UE group or a UE sub-group including the UE is to be paged in a paging occasion, wherein a sequence on which the PEI is based is a PDCCH-based sequence. In some aspects, the PDCCH processing component 908 may selectively process a paging PDCCH associated with the paging occasion based at least in part on the PEI.

In some aspects, the reception component 902 may receive a PEI, the PEI indicating whether at least one UE in a UE group or a UE sub-group including the UE is to be paged in a paging occasion, wherein the PEI is a sequence-based PEI, and wherein the PEI is received based at least in part on a sequence configuration configured on the UE. In some aspects, the PDCCH processing component 908 may selectively process a PDCCH associated with the paging occasion based at least in part on the PEI.

In some aspects, the reception component 902 may receive a PEI, the PEI indicating whether at least one UE in a UE group or a UE sub-group including the UE is to be paged in a paging occasion wherein the PEI is a sequence-based PEI, and wherein the PEI is received based at least in part on a distributed resource block allocation associated with the sequence. In some aspects, the PDCCH processing component 908 may selectively process a paging PDCCH associated with the paging occasion based at least in part on the PEI.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
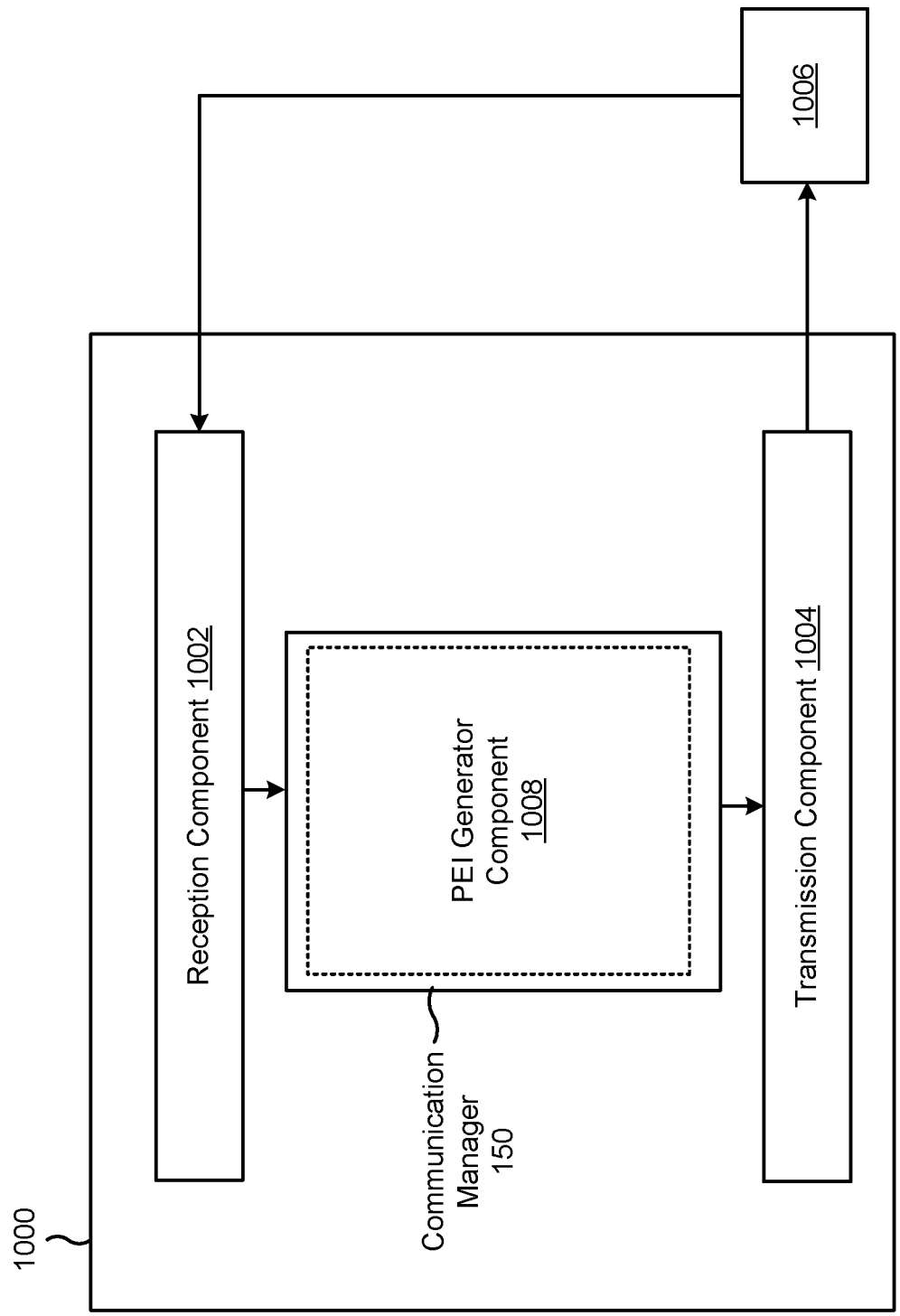

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a PEI generator component 1008, among other examples.

In some aspects, the apparatus 1000 may be configured to perform one or more operations described herein in connection with FIGS. 3-5. Additionally, or alternatively, the apparatus 1000 may be configured to perform one or more processes described herein. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

In some aspects, the PEI generator component 1008 may generate a PEI, the PEI indicating whether at least one UE in a UE group or a UE sub-group is to be paged in a paging occasion, wherein a sequence on which the PEI is based is a PDCCH-based sequence. In some aspects, the transmission component 1004 may transmit the PEI.

In some aspects, the PEI generator component 1008 may generate a PEI, the PEI indicating whether at least one UE in a UE group or a UE sub-group is to be paged in a paging occasion, wherein the PEI is a sequence-based PEI, and wherein the PEI is generated based at least in part on a sequence configuration configured on the UE. In some aspects, the transmission component 1004 may transmit the PEI.

In some aspects, the PEI generator component 1008 may generate a PEI, the PEI indicating whether at least one UE in a UE group or a UE sub-group is to be paged in a paging occasion, wherein the PEI is a sequence-based PEI, and wherein the PEI is generated based at least in part on a distributed resource block allocation associated with the sequence. In some aspects, the transmission component 1004 may transmit the PEI.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: receiving a PEI, the PEI indicating whether at least one UE in a UE group or a UE sub-group including the UE is to be paged in a paging occasion, wherein a sequence on which the PEI is based is a PDCCH-based sequence; and selectively processing a paging PDCCH associated with the paging occasion based at least in part on the PEI.

Aspect 2: The method of Aspect 1, wherein the PDCCH-based sequence is based at least in part on a set of encoded PDCCH payload bits.

Aspect 3: The method of Aspect 1, wherein the PDCCH-based sequence is based at least in part on a set of RNTIs.

Aspect 4: The method of Aspect 1, wherein the PDCCH-based sequence is based at least in part on a set of encoded PDCCH payload bits and a set of RNTIs.

Aspect 5: The method of any of aspects Aspect 1-4, wherein the PEI is received in a PDCCH candidate of a plurality of PDCCH candidates, wherein each PDCCH candidate of the plurality of PDCCH candidates is associated with a corresponding set of UEs of a plurality of sets of UEs.

Aspect 6: The method of Aspect 5, wherein the PDCCH candidate is associated with a set of UEs, of the plurality of sets of UEs, that includes the UE.

Aspect 7: A method of wireless communication performed by a UE, comprising: receiving a PEI, the PEI indicating whether at least one UE in a UE group or a UE sub-group including the UE is to be paged in a paging occasion, wherein the PEI is a sequence-based PEI, and wherein the PEI is received based at least in part on a sequence configuration configured on the UE; and selectively processing a paging PDCCH associated with the paging occasion based at least in part on the PEI.

Aspect 8: The method of Aspect 7, wherein the sequence configuration indicates a sequence generation technique associated with the PEI.

Aspect 9: The method of any of Aspects 7-8, wherein the sequence configuration indicates a symbol allocation associated with the PEI.

Aspect 10: The method of any of Aspects 7-9, wherein the sequence configuration indicates a quantity of resource blocks allocated for the PEI.

Aspect 11: The method of any of Aspects 7-10, wherein the sequence configuration indicates a resource element spacing for the PEI.

Aspect 12: The method of any of Aspects 7-11, wherein the sequence configuration indicates a starting resource element of the PEI in a particular resource block.

Aspect 13: The method of any of Aspects 7-12, wherein the sequence configuration indicates an ending resource element of the PEI in a particular resource block.

Aspect 14: The method of any of Aspects 7-13, wherein the PEI is based on a sequence associated with an SSS.

Aspect 15: The method of any of Aspects 7-13, wherein the PEI is based on a sequence associated with a TRS.

Aspect 16: The method of any of Aspects 7-14, wherein the PEI is based on a sequence associated with a CSI-RS.

Aspect 17: The method of any of Aspects 7-15, wherein the PEI is based on a PDCCH-based sequence.

Aspect 18: A method of wireless communication performed by a UE, comprising: receiving a PEI, the PEI indicating whether at least one UE in a UE group or a UE sub-group including the UE is to be paged in a paging occasion, wherein the PEI is a sequence-based PEI, and wherein the PEI is received based at least in part on a distributed resource block allocation associated with the sequence; and selectively processing a paging PDCCH associated with the paging occasion based at least in part on the PEI.

Aspect 19: The method of Aspect 18, wherein the PEI is received based at least in part on a reference CORESET and a corresponding interleaved CCE to REG mapping for distributed CCE allocation associated with a set of PDCCH candidates.

Aspect 20: The method of any of Aspects 18-19, wherein the PEI is received based at least in part on a mapping of a sequence to resource elements of a PDCCH candidate.

Aspect 21: The method of any of Aspects 18-20, wherein the distributed resource block allocation is indicated in a PEI configuration configured on the UE.

Aspect 22: The method of any of Aspects 18-21, wherein the PEI is based on a sequence associated with an SSS.

Aspect 23: The method of any of Aspects 18-21, wherein the PEI is based on a sequence associated with a TRS.

Aspect 24: The method of any of Aspects 18-21, wherein the PEI is based on a sequence associated with a CSI-RS.

Aspect 25: The method of any of Aspects 18-21, wherein the PEI is based on a PDCCH-based sequence.

Aspect 26: An apparatus for wireless communication at a device, comprising a processor; memory coupled with the processor; and instructions stored in the memory and executable by the processor to cause the apparatus to perform the method of one or more of Aspects 1-6.

Aspect 27: A device for wireless communication, comprising a memory and one or more processors coupled to the memory, the one or more processors configured to perform the method of one or more of Aspects 1-6.

Aspect 28: An apparatus for wireless communication, comprising at least one means for performing the method of one or more of Aspects 1-6.

Aspect 29: A non-transitory computer-readable medium storing code for wireless communication, the code comprising instructions executable by a processor to perform the method of one or more of Aspects 1-6.

Aspect 30: A non-transitory computer-readable medium storing a set of instructions for wireless communication, the set of instructions comprising one or more instructions that, when executed by one or more processors of a device, cause the device to perform the method of one or more of Aspects 1-6.

Aspect 31: An apparatus for wireless communication at a device, comprising a processor; memory coupled with the processor; and instructions stored in the memory and executable by the processor to cause the apparatus to perform the method of one or more of Aspects 7-17.

Aspect 32: A device for wireless communication, comprising a memory and one or more processors coupled to the memory, the one or more processors configured to perform the method of one or more of Aspects 7-17.

Aspect 33: An apparatus for wireless communication, comprising at least one means for performing the method of one or more of Aspects 7-17.

Aspect 34: A non-transitory computer-readable medium storing code for wireless communication, the code comprising instructions executable by a processor to perform the method of one or more of Aspects 7-17.

Aspect 35: A non-transitory computer-readable medium storing a set of instructions for wireless communication, the set of instructions comprising one or more instructions that, when executed by one or more processors of a device, cause the device to perform the method of one or more of Aspects 7-17.

Aspect 36: An apparatus for wireless communication at a device, comprising a processor; memory coupled with the processor; and instructions stored in the memory and executable by the processor to cause the apparatus to perform the method of one or more of Aspects 18-25.

Aspect 37: A device for wireless communication, comprising a memory and one or more processors coupled to the memory, the one or more processors configured to perform the method of one or more of Aspects 18-25.

Aspect 38: An apparatus for wireless communication, comprising at least one means for performing the method of one or more of Aspects 18-25.

Aspect 39: A non-transitory computer-readable medium storing code for wireless communication, the code comprising instructions executable by a processor to perform the method of one or more of Aspects 18-25.

Aspect 40: A non-transitory computer-readable medium storing a set of instructions for wireless communication, the set of instructions comprising one or more instructions that, when executed by one or more processors of a device, cause the device to perform the method of one or more of Aspects 18-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories, the one or more memories comprising instructions executable by the one or more processors individually or collectively to cause the UE to:
      receive a paging early indication (PEI), the PEI indicating whether at least one UE in a UE group or a UE sub-group including the UE is to be paged in a paging occasion,
         wherein a sequence on which the PEI is based is a physical downlink control channel (PDCCH)-based sequence, and
         wherein the PEI is received in a PDCCH candidate of a plurality of PDCCH candidates, wherein each PDCCH candidate of the plurality of PDCCH candidates is associated with a corresponding set of UEs of a plurality of sets of UEs; and
      selectively process a paging PDCCH associated with the paging occasion based at least in part on the PEI.

2. The UE of claim 1, wherein the PDCCH-based sequence is based at least in part on a set of encoded PDCCH payload bits.

3. The UE of claim 1, wherein the PDCCH-based sequence is based at least in part on a set of radio network temporary identifiers (RNTIs).

4. The UE of claim 1, wherein the PDCCH-based sequence is based at least in part on a set of encoded PDCCH payload bits and a set of radio network temporary identifiers (RNTIs).

5. The UE of claim 1, wherein the PDCCH candidate is associated with a set of UEs, of the plurality of sets of UEs, that includes the UE.

6. A user equipment (UE) for wireless communication, comprising:
one or more memories; and
one or more processors coupled to the one or more memories, the one or more memories comprising instructions executable by the one or more processors individually or collectively to cause the UE to:
receive a paging early indication (PEI), the PEI indicating whether at least one UE in a UE group or a UE sub-group including the UE is to be paged in a paging occasion,
wherein the PEI is a sequence-based PEI, and
wherein the PEI is received based at least in part on a sequence configuration of the UE by a network node; and
selectively process a paging physical downlink control channel (PDCCH) associated with the paging occasion based at least in part on the PEI.

7. The UE of claim 6, wherein the sequence configuration indicates a sequence generation technique associated with the PEI.

8. The UE of claim 6, wherein the sequence configuration indicates a symbol allocation associated with the PEI.

9. The UE of claim 6, wherein the sequence configuration indicates a quantity of resource blocks allocated for the PEI.

10. The UE of claim 6, wherein the sequence configuration indicates a resource element spacing for the PEI.

11. The UE of claim 6, wherein the sequence configuration indicates a starting resource element of the PEI in a particular resource block.

12. The UE of claim 6, wherein the sequence configuration indicates an ending resource element of the PEI in a particular resource block.

13. The UE of claim 6, wherein the PEI is based on a sequence associated with a secondary synchronization signal (SSS).

14. The UE of claim 6, wherein the PEI is based on a sequence associated with a tracking reference signal (TRS).

15. The UE of claim 6, wherein the PEI is based on a sequence associated with a channel state information reference signal (CSI-RS).

16. The UE of claim 6, wherein the PEI is based on a PDCCH-based sequence.

17. A user equipment (UE) for wireless communication, comprising:
one or more memories; and
one or more processors coupled to the one or more memories, the one or more memories comprising instructions executable by the one or more processors individually or collectively to cause the UE to:
receive a paging early indication (PEI), the PEI indicating whether at least one UE in a UE group or a UE sub-group including the UE is to be paged in a paging occasion,
wherein the PEI is a sequence-based PEI, and
wherein the PEI is received based at least in part on a distributed resource block allocation associated with the sequence-based PEI, and
wherein the PEI is received based at least in part on a reference control resource set (CORESET) and a corresponding interleaved control channel element (CCE) to resource element group (REG) mapping for distributed CCE allocation associated with a set of physical downlink control channel (PDCCH) candidates; and
selectively process a paging PDCCH associated with the paging occasion based at least in part on the PEI.

18. The UE of claim 17, wherein the PEI is received based at least in part on a mapping of a sequence to resource elements of a PDCCH candidate.

19. The UE of claim 17, wherein the distributed resource block allocation is indicated in a PEI configuration configured on the UE.

20. The UE of claim 17, wherein the PEI is based on a sequence associated with a secondary synchronization signal (SSS).

21. The UE of claim 17, wherein the PEI is based on a sequence associated with a tracking reference signal (TRS).

22. The UE of claim 17, wherein the PEI is based on a sequence associated with a channel state information reference signal (CSI-RS).

23. The UE of claim 17, wherein the PEI is based on a PDCCH-based sequence.

24. A method of wireless communication performed by a user equipment (UE), comprising:
receiving a paging early indication (PEI), the PEI indicating whether at least one UE in a UE group or a UE sub-group including the UE is to be paged in a paging occasion, at least one of:
wherein a sequence on which the PEI is based is a physical downlink control channel (PDCCH)-based sequence, and wherein the PEI is received in a PDCCH candidate of a plurality of PDCCH candidates, wherein each PDCCH candidate of the plurality of PDCCH candidates is associated with a corresponding set of UEs of a plurality of sets of UEs
wherein the PEI is received based at least in part on a sequence configuration configured on the UE by a network node, or
wherein the PEI is received based at least in part on a distributed resource block allocation associated with the sequence, and wherein the PEI is received based at least in part on a reference control resource set (CORESET) and a corresponding interleaved control channel element (CCE) to resource element group (REG) mapping for distributed CCE allocation associated with a set of PDCCH candidates; and
selectively processing a paging PDCCH associated with the paging occasion based at least in part on the PEI.

25. The method of claim 24, wherein the PDCCH-based sequence is based at least in part on at least one of:
a set of encoded PDCCH payload bits, or
a set of radio network temporary identifiers (RNTIs).

26. The method of claim 24, wherein the sequence configuration indicates:
a sequence generation technique associated with the PEI,
a symbol allocation associated with the PEI,
a quantity of resource blocks allocated for the PEI,
a resource element spacing for the PEI,
a starting resource element of the PEI in a particular resource block, or
an ending resource element of the PEI in a particular resource block.

* * * * *